US006983528B1

United States Patent
Müller et al.

(10) Patent No.: US 6,983,528 B1
(45) Date of Patent: Jan. 10, 2006

(54) STATOR WINDING METHOD FOR A BRUSHLESS DIRECT-CURRENT MOTOR

(75) Inventors: Jürgen Müller, Radolfzell (DE); Cornelius Peter, Bühl (DE); Hardy Wilkendorf, Owingen (DE)

(73) Assignee: TRW Automotive Electronics & Components GmbH & Co. KG (DE)

( * ) Notice: Subject to any disclaimer, the term of this patent is extended or adjusted under 35 U.S.C. 154(b) by 0 days.

(21) Appl. No.: 09/508,934

(22) PCT Filed: Sep. 17, 1998

(86) PCT No.: PCT/DE98/02765

§ 371 (c)(1),
(2), (4) Date: Jun. 2, 2000

(87) PCT Pub. No.: WO99/14840

PCT Pub. Date: Mar. 25, 1999

(30) Foreign Application Priority Data

Sep. 17, 1997 (DE) .......................... 197 40 937

(51) Int. Cl.
*H02K 15/08* (2006.01)

(52) U.S. Cl. .......................... 29/596; 29/605; 310/218; 310/184

(58) Field of Classification Search .................. 29/596, 29/598, 605, 732; 310/218, 216, 208, 184
See application file for complete search history.

(56) References Cited

U.S. PATENT DOCUMENTS

| 4,374,347 | A |   | 2/1983  | Müeller |       |
|-----------|---|---|---------|---------|-------|
| 4,426,771 | A | * | 1/1984  | Wang et al. | 29/596 |
| 5,065,503 | A |   | 11/1991 | Luciani et al. |  |
| 5,245,748 | A |   | 9/1993  | Luciani et al. |  |
| 5,392,506 | A |   | 2/1995  | Luciani et al. |  |
| 5,668,450 | A |   | 9/1997  | Glasier et al. |  |

FOREIGN PATENT DOCUMENTS

| EP | 0 469 426 A2 |   | 2/1992  |         |
|----|--------------|---|---------|---------|
| EP | 0 739 080 A2 |   | 10/1996 |         |
| JP | 63-110928    | * | 5/1988  | 310/216 |
| WO | WO 96/22629  | * | 7/1996  |         |

OTHER PUBLICATIONS

International Search Report, International Publication No. WO 96/22629.

* cited by examiner

*Primary Examiner*—A. Dexter Tugbang
(74) *Attorney, Agent, or Firm*—Fay, Sharpe, Fagan, Minnich & McKee, LLP

(57) ABSTRACT

A method for winding a stator for a brushless direct current motor, which has a stator body (9) with a predetermined number of to be wound stator teeth (3) with the stator teeth (3) respectively being wound with two coils (W1, W3; W2, W4) which are magnetically coupled and which facilitate by supply of current with variable directional orientation the generation of opposite magnetic fields, whereby each of the two coils (W1, W3, W2, W4) comprises a predetermined number of in parallel arranged conductors. The stator teeth (3) are respectively wound simultaneously in several partial winding steps, with two conductors (25, 27) or with an even number of 2n conductors, whereby one of the two conductors (25, 27) or n conductor of the 2n conductors is allocated to the one coil and the other of the two conductors (25, 27) or the other n conductor of the 2n conductors are allocated to the other coil and whereby a pre-determined number of partial winding steps is performed until the pre-determined number of conductors per coil (W1, W3; W2, W4) has been reached.

16 Claims, 4 Drawing Sheets

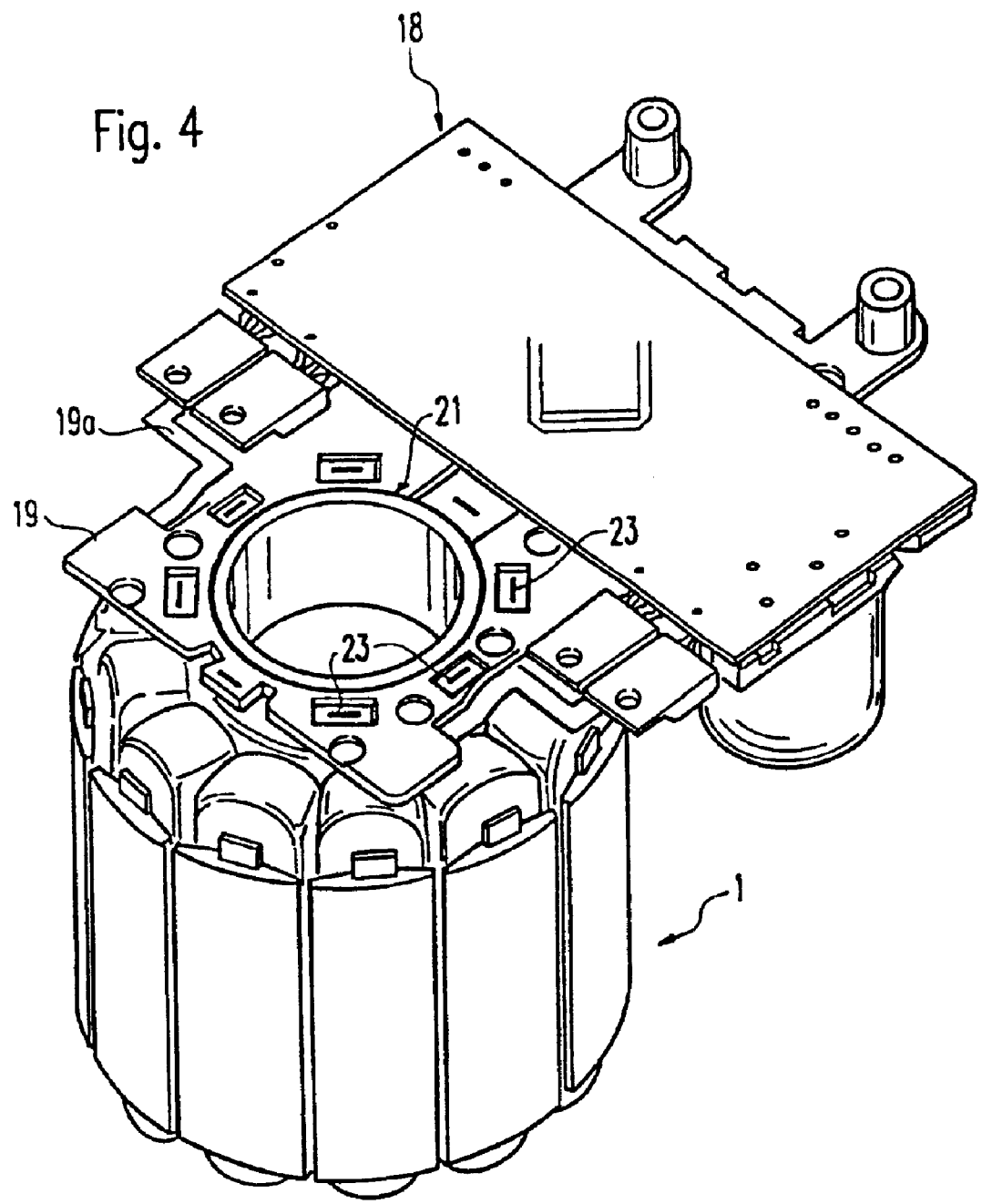

STATOR WINDING METHOD FOR A BRUSHLESS DIRECT-CURRENT MOTOR

The invention relates to a stator-winding method for a brush-less direct current motor with the characteristics of the Preamble to patent claim 1, as well as an appropriate stator with the characteristics of the Preamble to patent claim 5.

Specifically in automotive engineering there is a need for employing cost-effective motor-driven driving mechanisms, which are rather simple to control and quite inexpensive to produce, for example for an electrically controllable hydraulic pump for power steering. With respect to the mentioned application case, primarily brushless direct-current motors, specifically four-phase direct-current motors, are suitable because of their high degree of efficiency and ease of maintenance.

In order to permit extremely simple motor control, the coils realizing one phase respectively are frequently selected via one actuatable electronic switch, for example a power semiconductor and are intermittently connected, in the required fashion, with a direct current source. There is, however, the problem that each time when one phase in the respective coil is switched off, a negative tension peak is created as a result of self-induction, which may be, relative to the normal direction of current, discharged via diodes poled in inverse direction, which are positioned parallel to the respective switch element. This results, however, in a corresponding current in opposite direction, which must be taken into consideration in the selection and which, moreover, has a negative effect upon the efficiency of the motor.

For solving said problem, it is known, for example from WO-A 96/22629, to magnetically couple two coils each of a four-phase direct current motor. For said purpose, two coils each are applied on each pole and/or each group of poles, which are charged with direct current in the opposite direction in order to generate the desired opposite polarity of the magnetic fields generated by same. The coil orientation of the two coils can be the same. It suffices that the ends of one of the two coils are inversely connected with the source of the direct current.

As a result of the thus produced magnetic coupling of the two coils, the tension induced in the respective coil from self-induction during discharge of the respective phase is compensated for by a tension induced in the coupled coil. The stored magnetic energy is discharged via the diode which is arranged in parallel to the switch selecting the coupled coil. This produces an improvement in the degree of efficiency.

It is also known from WO-A-96/22629 that an improvement results of the magnetic coupling of the coils of the opposite phase of such four-phase direct current motor if the coils are wound simultaneously. This results in closer proximity of the wires of the two coupled coils and thus greater coupling inductivity.

Since, however, due to the high currents, several parallel conducted wires are needed for each coil, it was necessary, following the winding process during which all parallel wires of both coils are wound at the same time, to allocate the wire ends to the two coils. To that end it was necessary to at least mark the ends of the wires or to subsequently undertake allocation of the wire ends by means of passage measurements. Altogether, automation of the winding process and allocation of the wire ends to the coils and/or the contacting of the coils was not possible.

Based on said state of the art, it is the object of the invention to create a method for winding a stator for a brushless direct-current motor and an appropriate stator, whereby, as result of simplification of the manufacturing method, automation of the winding process is possible and allocation of wire ends to the coils.

The invention solves this object with the characteristics of patent claims 1 and/or 5.

The invention proceeds from the recognition that as a result of dividing the winding procedure for two each coupled coils (of the opposite phases) into partial winding steps, significant simplification is attained in the manufacturing method and thus easy automation capability.

In each partial winding procedure, 2n preferably however only two wires are wound, whereby one half of the wires or one of the two wires of the one coil and the other half of the wires or the other of the two coils are allocated to the other coil.

In comparison with the stators produced according to the known method, there is the added benefit that the stators produced according to the method of the invention have, as a rule, a further improved magnetic coupling of the coils of the respectively opposite phases. This can be explained in that with simultaneous winding of all wires of the two coils and allocation of the wire ends after the winding procedure, there was, more or less, random allocation and positioning of the individual wires within one coil. By separation into partial winding steps, closer proximity of the individual wires of the coils is achieved, at least on balance, or more uniform distribution (viewed across the winding cross section). Particularly with the winding of only two wires respectively (one wire per coil) it is attainable that these two wires are placed close to each other over the entire length of the coil.

In addition, this results in an improved capacity of replicating the electrical properties of the stator.

According to a preferred specific embodiment of the method according to the invention for allocation of conductors to the two coils, prior to each partial winding procedure, the one terminal end of the two conductors or the terminal ends of n of the 2n conductors are allocated to a first connection contact and the terminal ends of the other of the two conductors or the terminal ends of the other n of the 2n conductors are allocated to a second connection contact. After each partial winding procedure, the other end of the one of the two conductors or the other ends of n of the 2n conductors are allocated to a third connection contact and the other end of the other of the two conductors or the other ends of the other n of the 2n conductors are allocated to a fourth connection contact. The first and third connection contact thus serve for contacting the one coil and the second and fourth connection contact serve for contacting the other coil.

Allocation prior to a partial winding procedure is preferably done in that the (beginning) ends of the wires are connected with the appropriate connection contacts, for example by means of soldering, welding or clamping. As a result of said fixing, no additional holding of these ends is needed with an automatic winding device. After the partial winding procedure, the (posterior) ends of the wires can likewise be connected with the appropriate connection contacts.

In particular, with simultaneous winding of only two wires, it is possible to maintain in simple fashion the allocation of the wires during the entire winding procedure, so that no additional measures are needed for allocation, such as marking of the wires or passage measurings.

In the preferred specific embodiment of the stator according to the invention, connection contacts are preferably provided at one front side of the stator, said connection contacts having a number of fastening means which correspond to the number of the required partial winding procedures.

This guarantees that before or after each partial winding procedure it is possible to readily connect the wire ends with the appropriate connection contacts, whereby for each wire end or for each group of n wire ends of 2n simultaneously wound wires there is available an individual attachment means or a clamp.

Additional specific embodiments of the invention are apparent from the sub-claims.

In the following, the invention is explained in more detail, making use of an exemplary embodiment represented in the drawing:

FIG. 4 shows a perspective representation of the stator in FIG. 1 in mounted control circuit.

Figure 1:
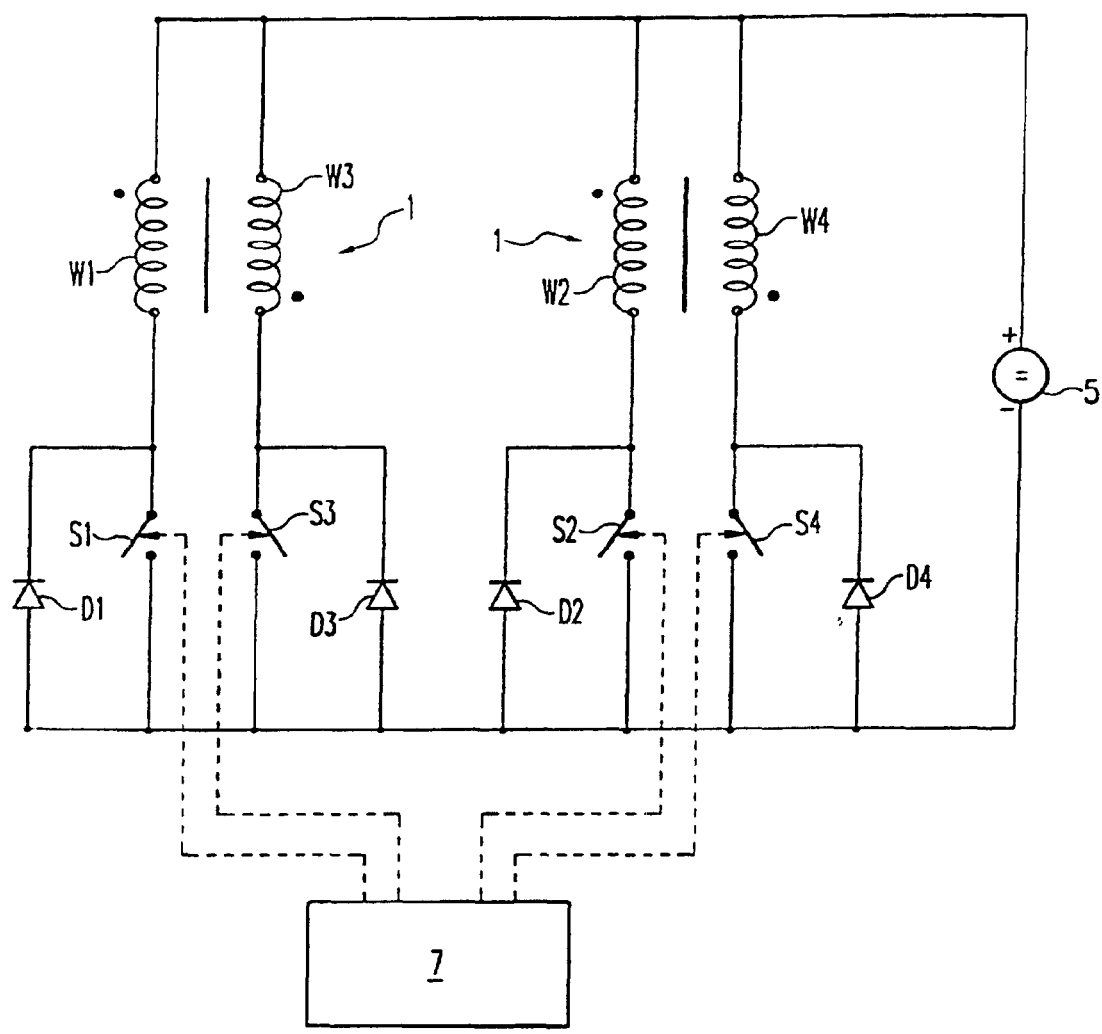
FIG. 1 shows a schematic representation of a four-phase direct current motor with associated actuation circuit.

FIG. 1 depicts a schematic representation of a four-phase direct current motor with a stator 1, on which are provided stator coils W1, W2, W3 and W4. The coils W1 to W4 are wound on teeth or poles 3 of stator 1. The indicated magnetic coupling of the opposite phases I and III or the corresponding coils W1 and W3, and also phases II and IV or the corresponding coils W2 and W4 is obtained in that the coils W1 and W3 or the coils W2 and W4 are wound on the same stator teeth.

The winding or contacting of the coils W1 and W3 or W2 and W4 takes places in such manner that opposite magnetic fields are produced in the teeth or poles of areas in front of the stator poles 3, facing a not shown rotor. This is indicated in FIG. 1 by the dots at the coils W1 to W4.

Each coil is connected with one end or one connection to a direct current source 5. The respective other end or the respective other connection of each coil is connected with a controllable electronic switch S1, S2, S3, S4, which can be designed, for example, as power semi conductor (e.g. Power Field Effect Transistor). Each switch S1 to S4 is connected with its control inlet with a motor control unit 7, which connects, in known fashion, the coils W1 to W4 with the direct current source for certain periods of time by appropriate selection of switches S1 to S4.

Placed in parallel to each controllable switch S1 to S4, is a diode D1 to D4, whereby the passage direction of the diodes is selected in such manner that upon closing of the appropriate switch, the associated diode becomes blocked.

As already explained, as a result of coupling the respectively opposite Phases I and III or II and IV and diodes D3 and D1 and D4 and D2, discharge is obtained of the stored magnetic energy during the off-switching of the respective phase, which guarantees an improvement of the efficiency of the motor.

Figure 2:
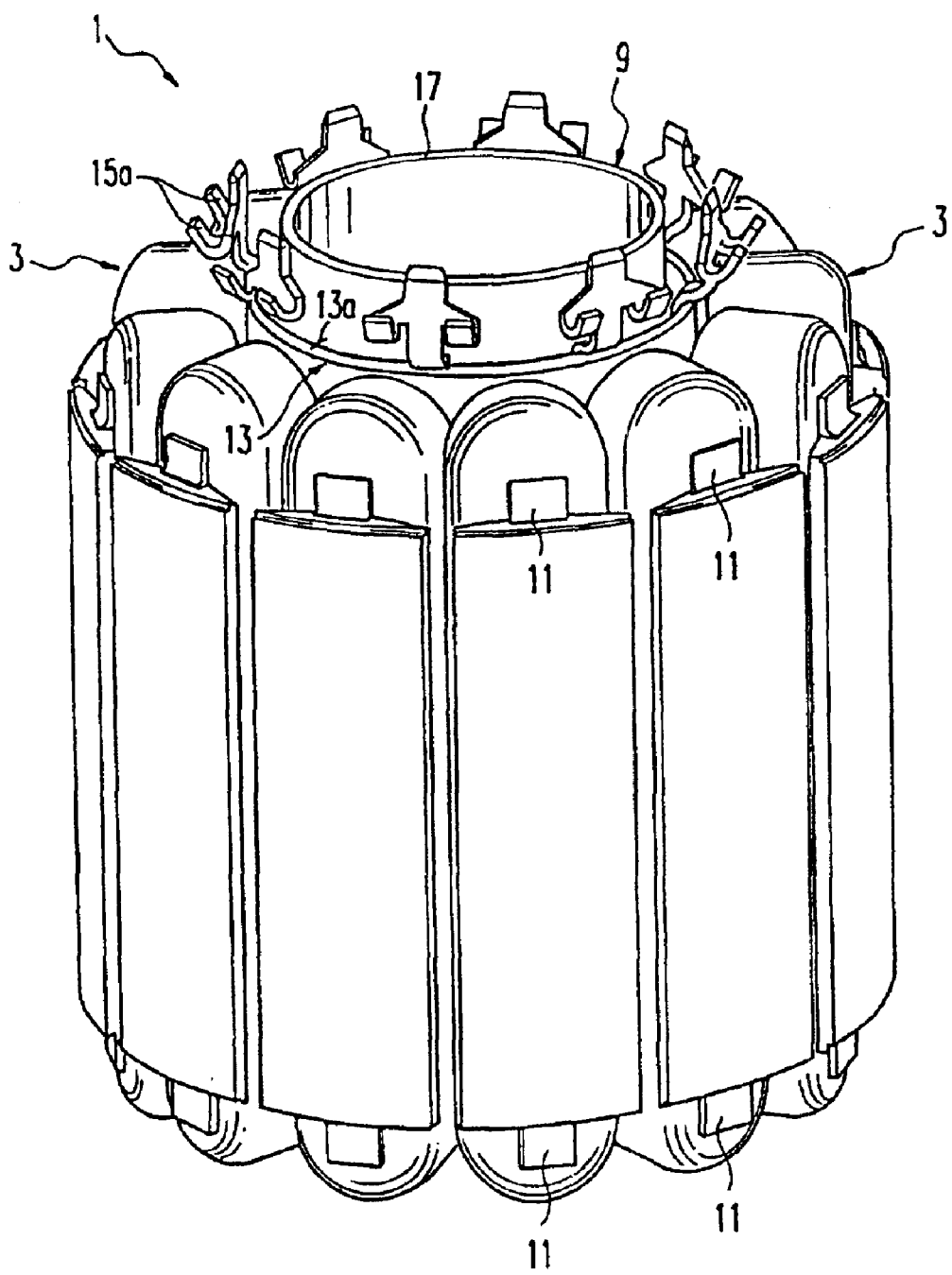
FIG. 2 shows a perspective representation of a stator according to the invention.

FIG. 2 depicts the constructive design of an appropriate stator 1 in perspective view. The indicated stator has twelve stator poles 3. The stator body 9 comprises in customary fashion packaged stator metal sheets, which extend vertically vis-a-vis the longitudinal axis of the stator.

The packet of the stator metal sheets can be initially produced in the usual fashion by stamping the packet together with two or more each of the metal sheets being joined by means of exertion of spot-pressure.

Subsequently, the package of stator metal sheets is spray-coated with a plastic body, with plastic coating being also generated in the interior of the stator teeth. Consequently, it is no longer necessary, as in the past, to provide a powder coating for these regions of the stator teeth in order to avoid damage to the insulation layer of the coil wires, specifically during the winding procedure.

At the same time, winding aids 11 are molded to the front sides of the stator teeth 3, which act as a guide for the wires during the winding of the coils W1 to W4, and which, concurrently, fix in their position those parts of the coils which protrude beyond the front sides of the stator teeth 3.

At one upper side, the stator body 9 has a molded-on ring 13 with a shoulder 13a. Into said frontal shoulder 13a, connection contacts 15 are pressed in. To that end, ring 13 is molded with appropriate recesses for the connection contacts, into which then connection contacts 15, made of sheet metal by means of stamping or bending, are pressed in with their terminal lugs.

The upwardly extending wall 17 of ring 13, above the shoulder 13a of ring 13 serves for fixing and fastening a control circuit 17, as is evident from FIG. 4. The control circuit can have a plastic-coated stamped grid 19 with an appropriate recess 21, which engages with wall 17 of ring 13. The underside of the stamped grid 19 can rest on the shoulder 13a of ring 13.

The connection contacts 15 engage with the contacting perforations 23 in the conductor tracks 19a of the stamped grid 19 and can be joined with same by means of soldering or similar method.

As a result of spray-coating with plastic the packet of the stator metal sheets in one single work step, whereby the interior regions of the stator teeth 3 are spray-coated and, at the same time, ring 13 and the winding aids 11 are spray-molded on, one obtains extremely cost-effective manufacturing of stator 1.

Figure 3:
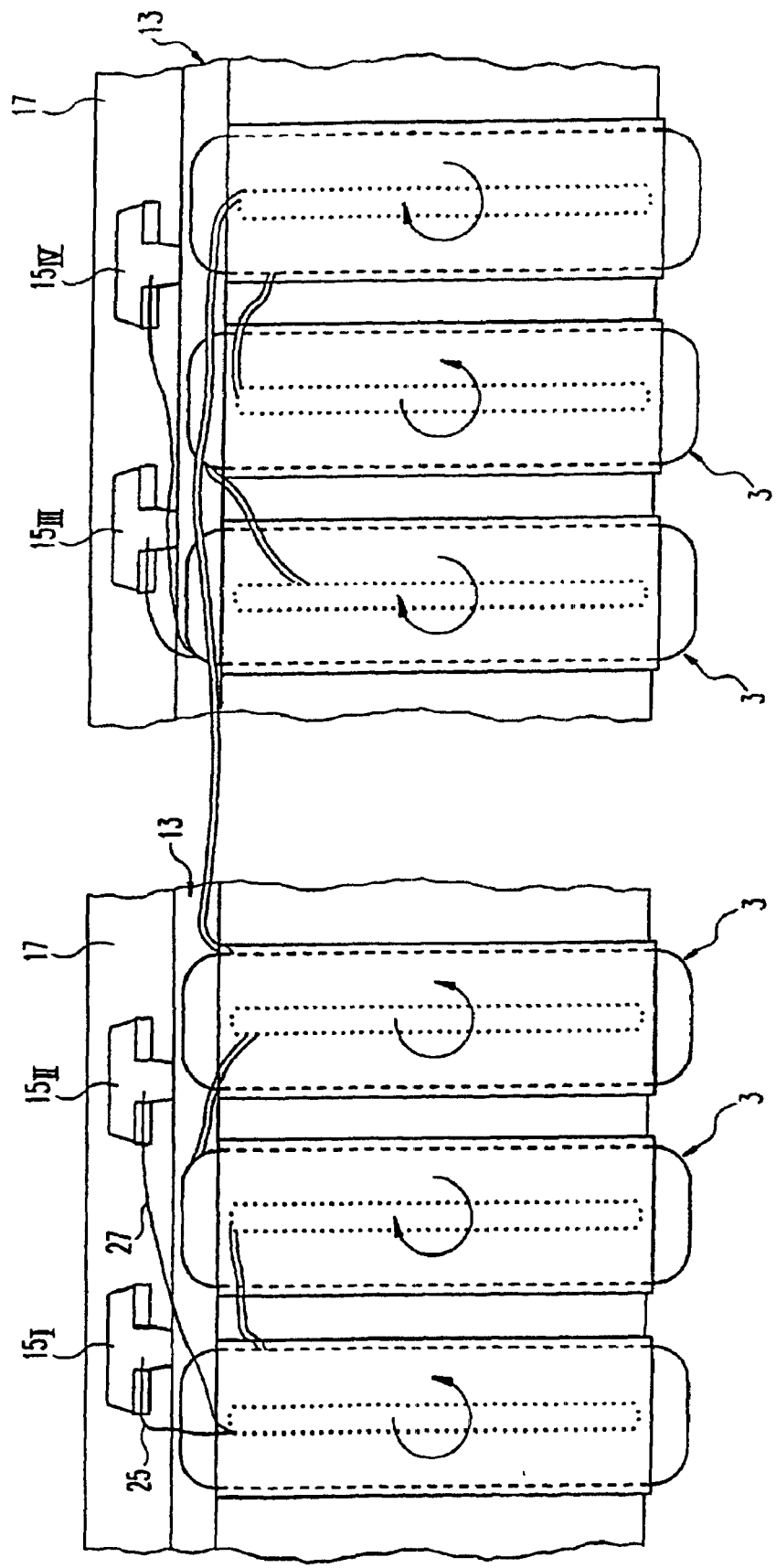
FIG. 3 shows a schematic representation of segments of an unwound later view of the stator in FIG. 1, in order to provide an explanation of the winding procedure

In the following, the method for winding stator 1 is a explained in more detail, making use of FIG. 3.

It should first be noted that in the represented exemplary embodiment each one of coils W1 to W4 extends over a totality of six stator teeth 3, which are divided, in known fashion, into two each other radially facing groups of three each adjacent stator teeth. As already explained, these six stator teeth respectively support two coupled coils, i.e. coils W1 and W3 or W2 and W4. Two of these groups are depicted in FIG. 3, whereby, hereinafter, these coils are identified for the sake of simplicity as W1 and W3. The remaining six stator teeth 3 for coils W2 and W4 are wound in similar fashion. In this regard, the method described below is to be employed in the appropriate manner.

Each of the coils W1 and W3 comprises, due to the required high current intensities, several, in parallel arranged partial coils of individual wires. According to the invention, in each instance, 2 or 2n wires (i.e. an even number of wires)—in the represented exemplary embodiment the two wires 25, 27—are simultaneously wound on the appropriate stator teeth 3.

To that end, the beginning ends of the 2 wires 25, 27 are first respectively connected with a first $15_I$ and a second $15_{II}$ of the connection contacts 15. For that purpose, the connection contacts present V-shaped clamping grooves 15a, into which the (insulated) wire ends are embedded and are fixed and contacted by pressing together the walls of the clamping grooves 15a.

After fixing of the wire ends, the first stator tooth 3 of the first group of three is wound. This is done in counter-clockwise direction with respect to the exemplary embodiment represented in FIG. 3. Following application of the desired number of windings, one then proceeds to the neighboring stator tooth, and the latter is wound in opposite direction with the desired number of windings (the middle stator tooth 3 of the left group in FIG. 3). Finally, one proceeds to the last stator tooth of the first group of three and it is provided with the desired number of windings. This again is done in the winding direction of the first stator tooth.

After that, one proceeds to the first stator tooth of the diametrically opposed group of three (in FIG. 3, the right stator tooth of the right group of three) and said stator tooth is wound. The winding of this second group of three of the stator teeth is done in similar fashion.

After the winding of the last stator tooth of the second group of three (the left stator tooth of the right group of three in FIG. 3), the end of wire 25 is connected with the third connection contact $15_{III}$ and the end of wire 27 with the fourth connection contact $15_{IV}$. The allocation of the wire ends to the connection contacts 15 is initially insignificant with respect to said first partial winding step. What must, of course, be observed is which of the connection contacts IS corresponds to said coils W1 and W3. In other words, for future selection of coils it must be known which of the two coils corresponds to what two connection contacts. The coils W1 and W3 are equivalent to each other, since they present the same winding direction.

Following completion of said first partial winding step, a second partial winding step is undertaken in like fashion. The only difference being that the wire ends are connected with additional attachment means of clamping grooves 15a of the first to fourth connection contacts.

This makes possible simple attachment of the wire ends without the need of loosening the previously wound wires.

In these and perhaps additional partial winding steps, attention must be paid, however, that with respect to the first partial winding step, the selected allocation of the connection contacts $15_I$ and $15_{III}$ to the one coil is observed, for example the first coil W1, and/or the connection contacts $15_{II}$ and $15_{IV}$ to the other coil, for example, coil W3.

Usually, however, one must establish from the very beginning that certain connection contacts correspond to certain specified coils or coil ends.

By already allocating the wire ends to certain connection contacts prior to the actual winding and observance of said allocation during the partial winding procedure, it is possible, in simple fashion, without additional measures, such as marking of the wires or implementation of passage measurements, to correctly connect, following the partial wind procedure, the wire ends with the proper connection contacts. It applies specifically to a small number of simultaneously wound wires (preferably two wires).

Overall, as many partial winding procedures are carried out as are necessary in order to reach the required number of parallel wires per coil W1, W3. The number of attachment means or clamping grooves 15a preferably corresponds to the number of the required partial winding steps.

The two other coupled coils W2 and W4 are manufactured in similar fashion, whereby attention needs to be paid that the orientation of the winding must also be correctly selected with respect to the already provided coils W1 and W3.

The represented method is, of course, not only applicable with respect to four-phase direct current motors, but also for motors with any (even) number of phases, whereby, in each case, the coils of two phases are magnetically coupled.

What is claimed is:

1. A method for winding a stator of a brushless direct current motor having a stator body with a pre-determined number of stator teeth, wherein the stator teeth are respectively wound with two coils which are magnetically coupled and which permit the generation of opposite magnetic fields by the supply of current with variable directional orientation, and wherein each of the two coils comprises a predetermined number of conductors, the method comprising the steps of:

a) simultaneously winding each of the two coils onto said stator teeth in several partial winding steps with an even number of 2n conductors, allocating a first set of n conductors of the 2n conductors to a first coil of said two coils and allocating the other set of n conductors of the 2n conductors to a second coil of said two coils; and, b) repeating step a) until the predetermined number of conductors per coil has been reached.

2. A coil winding method for winding a predetermined number of conductors to form a set of magnetically coupled coil pairs on a plurality of stator teeth of a stator body in a motor, each set of coil pairs generating opposing magnetic fields in the plurality of stator teeth, the coil winding method comprising the steps of:

in a first partial coil winding step, simultaneously winding 2n conductors together onto a first plurality of stator teeth of said stator body, a first group $n_I$ of said 2n conductors being assigned to a first coil of said set of magnetically coupled coil pairs and a second group $n_2$ of said 2n conductors being assigned to a second coil of said set of magnetically coupled coil pairs; and, repeating said simultaneous winding of said 2n conductors until said predetermined number of conductors are wound onto said first plurality of stator teeth to form a first magnetically coupled coil pair of said set of magnetically coupled coil pairs.

3. The method according to claim 2 further including:

winding said predetermined number of conductors on a second plurality of stator teeth of said stator body in said motor to form a second magnetically coupled coil pair of said set of magnetically coupled coil pairs.

4. The method according to claim 3 wherein the step of winding said predetermined number of conductors on said second plurality of stator teeth includes the steps of:

e) in a second partial coil winding step, simultaneously winding 2n conductors together onto a second plurality of stator teeth of said stator body;

f) selecting a third group $n_3$ of said 2n conductors and assigning the third group $n_3$ to a third coil of said set of magnetically coupled coil pairs;

g) selecting a fourth group $n_4$ of said 2n conductors and assigning the fourth group $n_4$ to a fourth coil of said set of magnetically coupled coil pairs; and, h) repeating steps e) through g) until said predetermined number of conductors are wound onto said second plurality of stator teeth to form said second magnetically coupled coil pair of said set of magnetically coupled coil pairs.

5. The method according to claim 4 wherein;

the first partial coil winding step includes simultaneously winding said 2n conductors onto said first plurality of stator teeth different from said second plurality of stator teeth; and, the second partial coil winding step includes simultaneously winding said 2n conductors onto said second plurality of stator teeth different from said first plurality of stator teeth.

6. The method according to claim 5 wherein:
the first partial coil winding step of simultaneously winding said 2n conductors onto said first plurality of stator teeth includes simultaneously winding two conductors onto said first set of six stator teeth; and,
the second partial coil winding step of simultaneously winding said 2n conductors onto said second plurality of stator teeth includes simultaneously winding two conductors onto said second set of six stator teeth.

7. The method according to claim 2 wherein:
the step of assigning said first group $n_1$ of said 2n conductors includes, prior to performing each said at least one first partial winding step, connecting said first group $n_1$ of said 2n conductors to a first electrical connection contact $15_I$, on said stator body; and,
the step of assigning said second group $n_2$ of said 2n conductors Includes, prior to performing each said at least one first partial winding step, connecting said second group $n_2$ of said 2n conductors to a second electrical connection contact $15_{II}$ on said stator body.

8. The method according to claim 7 wherein:
the step of assigning said first group $n_1$ of said 2n conductors further includes, after performing said each at least one first partial winding step, connecting said first group $n_1$ of said 2n conductors to a third electrical connection contact $15_{III}$ on said stator body; and,
the step of assigning said second group n, of said 2n conductors further includes, after performing said each at least one first partial winding step, connecting said second group $n_2$ of said 2n conductors to a fourth electrical connection contact $15_{IV}$ on said stator body.

9. A coil winding method for winding a predetermined number of conductors to form a set of magnetically coupled coil pairs on a plurality of stator teeth of a stator body in a motor, each set of coil pairs generating opposing magnetic fields in the plurality of stator teeth, the coil winding method comprising;
a) in a first partial coil winding step, simultaneously winding 2n conductors together onto a first plurality of stator teeth of said stator body;
b) selecting a first group $n_I$ of said 2n conductors and assigning the first group $n_I$ to a first coil of said set of magnetically coupled coil pairs;
c) selecting a second group $n_2$ of said 2n conductors and assigning the second group $n_2$ to a second coil of said set of magnetically coupled coil pairs;
d) repeating steps a) through c) until said predetermined number of conductors are wound onto said first plurality of stator teeth to form a first magnetically coupled coil pair of said set of magnetically coupled coil pairs; and,
winding said predetermined number of conductors on a second plurality of stator teeth of said stator body in said motor to form a second magnetically coupled coil pair of said set of magnetically coupled coil pairs.

10. The method according to claim 9 wherein the step of winding said predetermined number of conductors on said second plurality of stator teeth includes the steps of:
e) in a second partial coil winding step, simultaneously winding 2n conductors together onto a second plurality of stator teeth of said stator body;
f) selecting a third group $n_3$ of said 2n conductors and assigning the third group $n_3$ to a third coil of said set of magnetically coupled coil pairs;
g) selecting a fourth group $n_4$ of said 2n conductors and assigning the fourth group $n_4$ to a fourth coil of said set of magnetically coupled coil pairs; and, h) repeating steps e) through g) until said predetermined number of conductors are wound onto said second plurality of stator teeth to form said second magnetically coupled coil pair of said set of magnetically coupled coil pairs.

11. The method according to claim 10 wherein;
the first partial coil winding (step includes simultaneously winding said 2n conductors onto said first plurality of stator teeth different from said second plurality of stator teeth; and,
the second partial coil winding step includes simultaneously winding said 2n conductors onto said second plurality of stator teeth different from said first plurality of stator teeth.

12. The method according to claim 11 wherein:
the first partial coil winding step of simultaneously winding said 2n conductors onto said first plurality of stator teeth includes simultaneously winding two conductors onto said first set of six stator teeth; and,
the second partial coil winding step of simultaneously winding said 2n conductors onto said second plurality of stator teeth includes simultaneously winding two conductors onto said second set of six stator teeth.

13. A coil winding method for winding a predetermined number of conductors to form a set of magnetically coupled coil pairs on a plurality of stator teeth of a stator body in a motor, each set of coil pairs generating opposing magnetic fields in the plurality of stator teeth, the coil winding method comprising:
a) in a first partial coil winding step, simultaneously winding 2n conductors together onto a first plurality of stator teeth of said stator body;
b) selecting a first group $n_1$ of said 2n conductors and assigning the first group $n_I$ to a first coil of said set of magnetically coupled coil pairs;
c) selecting a second group $n_2$ of said 2n conductors and assigning the second group $n_2$ to a second coil of said set of magnetically coupled coil pairs; and,
d) repeating steps a) through c) until said predetermined number of conductors are wound onto said first plurality of stator teeth to form a first magnetically coupled coil pair of said set of magnetically coupled coil pairs; and, wherein: the step of assigning said first group $n_1$ of said 2n conductors includes, prior to performing each said at least one first partial winding step, connecting said first group $n_1$ of said 2n conductors to a first electrical connection contact $15_I$ on said stator body, and the step of assigning said second group $n_2$ of said 2n conductors includes, prior to performing each said at least one first partial winding step, connecting said second group $n_2$ of said 2n conductors to a second electrical connection contact $15_{II}$ on said stator body.

14. The method according to claim 13 wherein:
the step of assigning said first group $n_1$ of said 2n conductors further includes, after performing said each at least one first partial winding step, connecting said first group $n_1$ of said 2n conductors to a third electrical connection contact $15_{III}$ on said stator body; and,
the step of assigning said second group $n_1$ of said 2n conductors further includes, after performing said each at least one first partial winding step, connecting said second group $n_2$ of said 2n conductors to a fourth electrical connection contact $15_{IV}$ on said stator body.

15. A coil winding method for winding a predetermined number of conductors to form a set of magnetically coupled coil pairs on a plurality of stator teeth of a stator body in a motor, each set of coil pairs generating opposing magnetic fields in the plurality of stator teeth, the coil winding method comprising:

a) in a partial coil winding step, simultaneously winding 2n conductors together onto a first plurality of stator teeth of said stator body;

b) selecting a first group $n_1$ of said 2n conductors and assigning the first group $n_1$ to a first coil of said set of magnetically coupled coil pairs by, prior to performing said partial winding step, connecting said first group $n_1$ of said 2n conductors to a first electrical connection contact on said stator body;

c) selecting a second group $n_2$ of said 2n conductors and assigning the second group $n_2$ to a second coil of said set of magnetically coupled coil pairs by, prior to performing said partial winding step, connecting said second group $n_2$ of said 2n conductors to a second electrical connection contact on said stator body; and, d) repeating steps a) through c) until said predetermined number of conductors are wound onto said first plurality of stator teeth to form a first magnetically coupled coil pair of said set of magnetically coupled coil pairs.

16. A coil winding method for winding a predetermined number of conductors to form a set of magnetically coupled coil pairs on a plurality of stator teeth of a stator body in a motor, each set of coil pairs generating opposing magnetic fields in the plurality of stator teeth, the coil winding method comprising:

a) in a first partial coil winding step, simultaneously winding a first pair of conductors together onto a first plurality of stator teeth of said stator body;

b) selecting a first group $n_1$ of said first pair of conductors and assigning the first group $n_1$ to a first coil of said set of magnetically coupled coil pairs;

c) selecting a second group $n_2$ of said first pair of conductors and assigning the second group $n_2$ to a second coil of said set of magnetically coupled coil pairs;

d) repeating steps a) through c) until said predetermined number of conductors are wound onto said first plurality of stator teeth to form a first magnetically coupled coil pair of said set of magnetically coupled coil pairs;

e) in a second partial coil winding step, simultaneously winding a second pair of conductors together onto a second plurality of stator teeth of said stator body different from said first plurality of stator teeth;

f) selecting a third group $n_3$ of said second pair of conductors and assigning the third group $n_3$ to a third coil of said set of magnetically coupled coil pairs;

g) selecting a fourth group $n_4$ of said second pair of conductors and assigning the fourth group $n_4$ to a fourth coil of said set of magnetically coupled coil pairs; and, h) repeating steps e) through g) until said predetermined number of conductors are wound onto said second plurality of stator teeth to form said second magnetically coupled coil pair of said set of magnetically coupled coil pairs.

* * * * *